US009524222B2

(12) United States Patent
Jiang et al.

(10) Patent No.: US 9,524,222 B2
(45) Date of Patent: Dec. 20, 2016

(54) METHOD AND APPARATUS FOR FAULT DETECTION IN A CONTROLLER AREA NETWORK

(71) Applicant: GM GLOBAL TECHNOLOGY OPERATIONS LLC, Detroit, MI (US)

(72) Inventors: Shengbing Jiang, Rochester Hills, MI (US); Yilu Zhang, Northville, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 290 days.

(21) Appl. No.: 14/194,805

(22) Filed: Mar. 2, 2014

(65) Prior Publication Data

US 2015/0082096 A1   Mar. 19, 2015

Related U.S. Application Data

(60) Provisional application No. 61/878,538, filed on Sep. 16, 2013.

(51) Int. Cl.
| G06F 11/00 | (2006.01) |
| G06F 11/30 | (2006.01) |
| G06F 11/07 | (2006.01) |
| H04L 12/26 | (2006.01) |
| H04L 12/40 | (2006.01) |

(52) U.S. Cl.
CPC ......... *G06F 11/3006* (2013.01); *G06F 11/079* (2013.01); *G06F 11/0739* (2013.01); *G06F 11/30* (2013.01); *H04L 12/40169* (2013.01); *H04L 43/0823* (2013.01); *H04L 2012/40215* (2013.01)

(58) Field of Classification Search
CPC . H04J 3/0652; H04L 7/10; H04L 2012/40215; H04L 2012/40273; H04L 41/0659; H04L 43/045; H04L 43/0847
See application file for complete search history.

(56) References Cited

U.S. PATENT DOCUMENTS

| 5,111,460 | A  | * | 5/1992 | Botzenhardt | ....... H04L 12/2602 |
|           |    |   |        |             | 370/245 |
| 7,039,577 | B1 | * | 5/2006 | Fingerhut   | ............... H04L 41/12 |
|           |    |   |        |             | 370/252 |
| 7,812,617 | B2 |   | 10/2010 | Hofman     | |
| 8,015,445 | B2 | * | 9/2011 | Ando        | .................. H04L 43/0823 |
|           |    |   |        |             | 714/25 |
| 8,213,321 | B2 |   | 7/2012 | Butts et al. | |
| 8,265,100 | B2 | * | 9/2012 | Steiner     | .................. H04J 3/0652 |
|           |    |   |        |             | 370/503 |

(Continued)

OTHER PUBLICATIONS

U.S. Appl. No. 13/686,361, Jiang, et al.

*Primary Examiner* — Bryce Bonzo
*Assistant Examiner* — Jeison C Arcos (57) ABSTRACT

A controller area network (CAN) has a plurality of CAN elements including a communication bus and a plurality of controllers. A method for monitoring the CAN includes detecting occurrences of a first short-lived fault and a second short-lived fault within a predefined time window. A first fault set including at least one inactive controller associated with the first short-lived fault and a second fault set including at least one inactive controller associated with the second short-lived fault are identified. An intermittent fault is located in the CAN based upon the first and second fault sets.

16 Claims, 5 Drawing Sheets

(56) References Cited

U.S. PATENT DOCUMENTS

| | | | |
|---|---|---|---|
| 2004/0138852 A1* | 7/2004 | Everts | G01R 31/2817 |
| | | | 702/179 |
| 2008/0186870 A1* | 8/2008 | Butts | H04L 41/0659 |
| | | | 370/252 |
| 2009/0122812 A1* | 5/2009 | Steiner | H04J 3/0652 |
| | | | 370/503 |
| 2010/0180003 A1* | 7/2010 | Jiang | G06Q 10/06 |
| | | | 709/208 |
| 2011/0188371 A1 | 8/2011 | Brunnberg et al. | |
| 2012/0158240 A1 | 6/2012 | Downs, Jr. et al. | |
| 2013/0136007 A1* | 5/2013 | Jiang | H04L 12/417 |
| | | | 370/242 |
| 2013/0201817 A1* | 8/2013 | Jiang | H04L 41/0659 |
| | | | 370/217 |
| 2014/0149801 A1* | 5/2014 | Jiang | G06F 11/2005 |
| | | | 714/43 |
| 2015/0055473 A1* | 2/2015 | Moriya | H04L 12/40006 |
| | | | 370/235 |

* cited by examiner

METHOD AND APPARATUS FOR FAULT DETECTION IN A CONTROLLER AREA NETWORK

CROSS REFERENCE TO RELATED APPLICATIONS

This application claims the benefit of U.S. Provisional Application No. 61/878,538, filed on Sep. 16, 2013, which is incorporated herein by reference.

TECHNICAL FIELD

This disclosure is related to fault isolation associated with communications in controller area networks.

BACKGROUND

The statements in this section merely provide background information related to the present disclosure. Accordingly, such statements are not intended to constitute an admission of prior art.

Vehicle systems include a plurality of subsystems, including by way of example, engine, transmission, ride/handling, braking, HVAC, and occupant protection. Multiple controllers may be employed to monitor and control operation of the subsystems. The controllers can be configured to communicate via a controller area network (CAN) to coordinate operation of the vehicle in response to operator commands, vehicle operating states, and external conditions. A fault can occur in one of the controllers that affects communications via a CAN bus.

Topology of a network such as a CAN refers to an arrangement of elements. Known CAN systems employ a bus topology for the communication connection among all the controllers that can include a linear topology, a star topology, or a combination of star and linear topologies. Known high-speed CAN systems employ linear topologies, whereas known low-speed CAN systems employ a combination of the star and linear topologies. Known CAN systems employ separate power and ground topologies for the power and ground lines to all the controllers. Known controllers communicate with each other through messages that are sent at different periods on the CAN bus. A physical topology describes arrangement or layout of physical elements including links and nodes. A logical topology describes flow of data messages or power within a network between nodes employing links.

Known systems detect faults at a message-receiving controller, with fault detection accomplished for the message using signal supervision and signal time-out monitoring at an interaction layer of the controller. Faults can be reported as a loss of communications. Such detection systems generally are unable to identify a root cause of a fault, and are unable to distinguish between transient and intermittent faults. One known detection system requires separate monitoring hardware and dimensional details of physical topology of a network to effectively monitor and detect faults in the network.

SUMMARY

A controller area network (CAN) has a plurality of CAN elements including a communication bus and a plurality of controllers. A method for monitoring the CAN includes detecting occurrences of a first short-lived fault and a second short-lived fault within a predefined time window. A first fault set including at least one inactive controller associated with the first short-lived fault and a second fault set including at least one inactive controller associated with the second short-lived fault are identified. An intermittent fault is located in the CAN based upon the first and second fault sets.

BRIEF DESCRIPTION OF THE DRAWINGS

One or more embodiments will now be described, by way of example, with reference to the accompanying drawings, in which:

FIG. 5 including FIGS. 5-1 and 5-2 illustrates a timeline indicating controller status for a plurality of CAN elements including a plurality of controllers in relation to time, in accordance with the disclosure.

DETAILED DESCRIPTION

Figure 1:
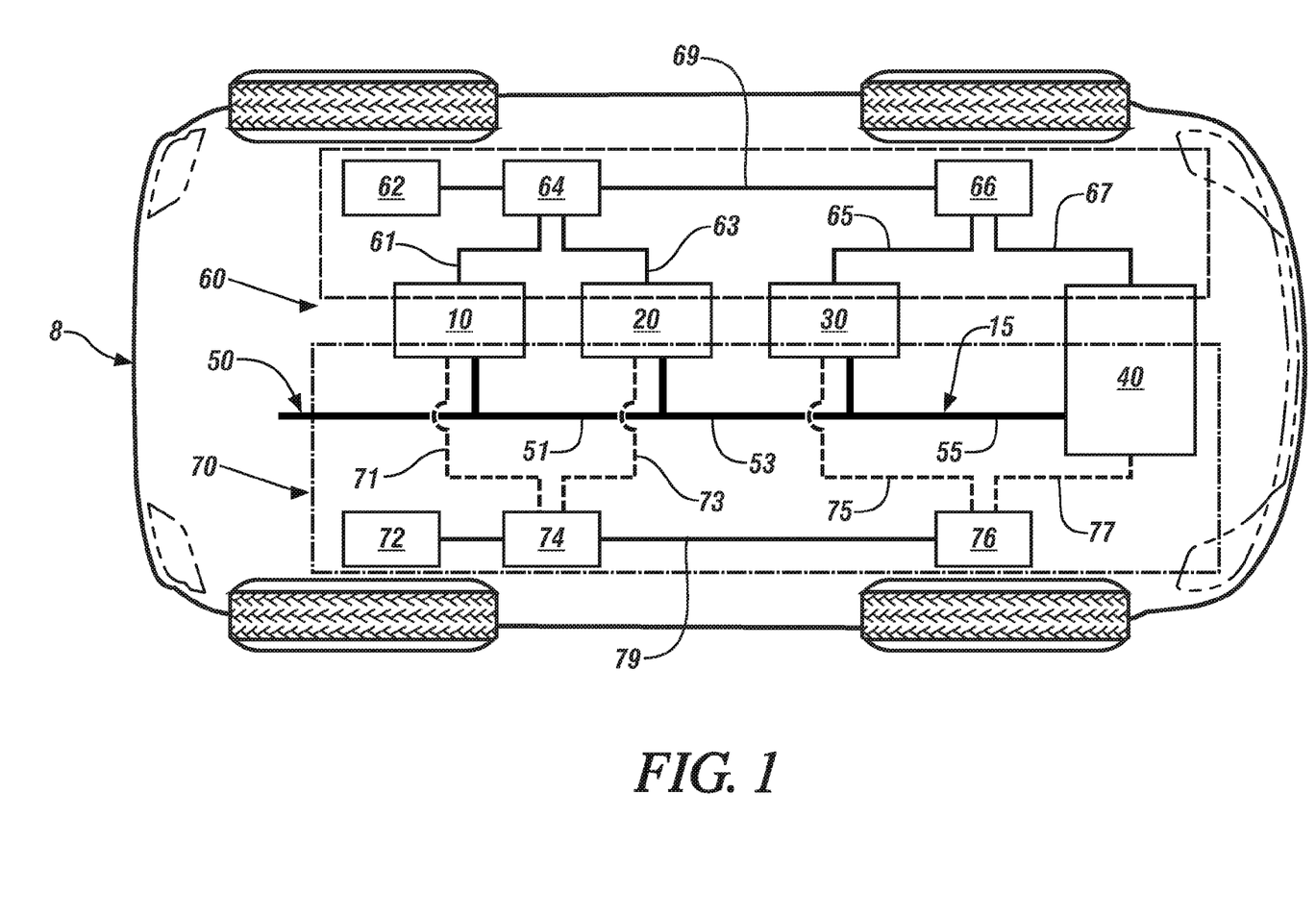
FIG. 1 illustrates a vehicle including a controller area network (CAN) with a CAN bus and a plurality of nodes, e.g., controllers, in accordance with the disclosure.

Referring now to the drawings, wherein the showings are for the purpose of illustrating certain exemplary embodiments only and not for the purpose of limiting the same, FIG. 1 schematically illustrates a vehicle 8 including a controller area network (CAN) 50 including a CAN bus 15 and a plurality of nodes, i.e., controllers 10, 20, 30 and 40. The term "node" refers to any active electronic device that signally connects to the CAN bus 15 and is capable of sending, receiving, or forwarding information over the CAN bus 15. Each of the controllers 10, 20, 30 and 40 signally connects to the CAN bus 15 and electrically connects to a power grid 60 and a ground grid 70. Each of the controllers 10, 20, 30 and 40 includes an electronic controller or other on-vehicle device that is configured to monitor or control operation of a subsystem of the vehicle 8 and communicate via the CAN bus 15. In one embodiment, one of the controllers, e.g., controller 40, is configured to monitor the CAN 50 and the CAN bus 15, and may be referred to herein as a CAN controller. The illustrated embodiment of the CAN 50 is a non-limiting example of a CAN, which may be employed in any of a plurality of system configurations.

The CAN bus 15 includes a plurality of communications links, including a first communications link 51 between controllers 10 and 20, a second communications link 53 between controllers 20 and 30, and a third communications link 55 between controllers 30 and 40. The power grid 60 includes a power supply 62, e.g., a battery that electrically connects to a first power bus 64 and a second power bus 66 to provide electric power to the controllers 10, 20, 30 and 40 via power links. As shown, the power supply 62 connects to the first power bus 64 and the second power bus 66 via power links that are arranged in a series configuration, with power link 69 connecting the first and second power buses 64 and 66. The first power bus 64 connects to the controllers 10 and 20 via power links that are arranged in a star configuration, with power link 61 connecting the first power bus 64 and the controller 10 and power link 63 connecting the first power bus 64 to the controller 20. The second power bus 66 connects to the controllers 30 and 40 via power links that are arranged in a star configuration, with power link 65 connecting the second power bus 66 and the controller 30 and power link 67 connecting the second power bus 66 to the controller 40. The ground grid 70 includes a vehicle ground 72 that connects to a first ground bus 74 and a second ground bus 76 to provide electric ground to the controllers 10, 20, 30 and 40 via ground links. As shown, the vehicle ground 72 connects to the first ground bus 74 and the second ground bus 76 via ground links that are arranged in a series configuration, with ground link 79 connecting the first and second ground buses 74 and 76. The first ground bus 74 connects to the controllers 10 and 20 via ground links that are arranged in a star configuration, with ground link 71 connecting the first ground bus 74 and the controller 10 and ground link 73 connecting the first ground bus 74 to the controller 20. The second ground bus 76 connects to the controllers 30 and 40 via ground links that are arranged in a star configuration, with ground link 75 connecting the second ground bus 76 and the controller 30 and ground link 77 connecting the second ground bus 76 to the controller 40. Other topologies for distribution of communications, power, and ground for the controllers 10, 20, 30 and 40 and the CAN bus 15 can be employed with similar effect.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Each of the controllers 10, 20, 30 and 40 transmits and receives messages across the CAN 50 via the CAN bus 15, with message transmission rates occurring at different periods for different ones of the controllers. A CAN message has a known, predetermined format that includes, for example, a start of frame (SOF), an identifier (11-bit identifier), a single remote transmission request (RTR), a dominant single identifier extension (IDE), a reserve bit (r0), a 4-bit data length code (DLC), up to 64 bits of data (DATA), a 16-bit cyclic redundancy check (CDC), 2-bit acknowledgement (ACK), a 7-bit end-of-frame (EOF) and a 3-bit interframe space (IFS). A CAN message can be corrupted, with known errors including stuff errors, form errors, ACK errors, bit 1 errors, bit 0 errors, and CRC errors. The errors are used to generate an error warning status including one of an error-active status, an error-passive status, and a bus-off error status. The error-active status, error-passive status, and bus-off error status are assigned based upon increasing quantity of detected bus error frames, i.e., an increasing bus error count. Known CAN bus protocols include providing network-wide data consistency, which can lead to globalization of local errors. This permits a faulty, non-silent controller to corrupt a message on the CAN bus 15 that originated at another of the controllers. A faulty, non-silent controller is referred to herein as a fault-active controller. When one of the controllers is assigned the bus-off error status, it is prohibited from communicating on the CAN bus for a period of time. This includes prohibiting the affected controller from receiving messages and from transmitting messages until a reset event occurs, which can occur after a period of time when the controller is inactive. Thus, when a fault-active controller is assigned the bus-off error state, it is prohibited from communicating on the CAN bus for a period of time, and is unable to corrupt other messages on the CAN bus during the period of time when it is inactive.

Figure 2:
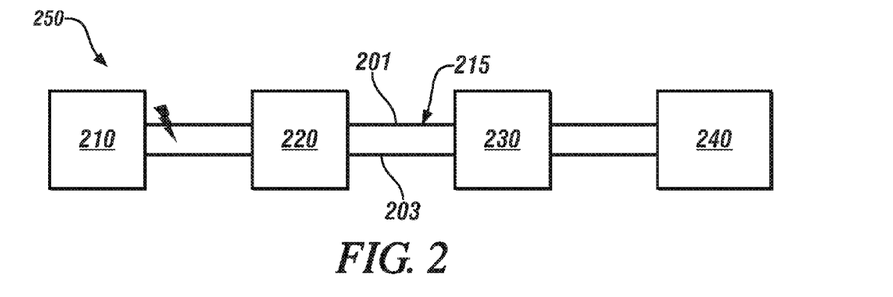
FIG. 2 illustrates an integrated controller area network that is analogous to the CAN of FIG. 1, including a CAN bus having wire cables, a plurality of nodes, e.g., controllers, and a data link control, in accordance with the disclosure.

FIG. 2 schematically illustrates an integrated controller area network 250 similar to the CAN 50 shown with reference to FIG. 1, including a two-wire CAN bus 215 including wire cables CAN+ 201 and CAN− 203, and a plurality of nodes, e.g., controllers 210, 220, 230 and 240. As shown, controller 240 is a monitoring controller. An open-wire fault on one of the wire cables, e.g., an open-wire fault in CAN+ 201 between controllers 210 and 220 interrupts bus communications from controller 210 to controllers 220, 230 and 240. This can cause the controllers 220, 230 and 240 to enter a bus-off state and be detected as inactive nodes.

A CAN fault is a malfunction that leads to a lost or corrupted message on the CAN bus thus interrupting communications between controllers in the CAN. A CAN fault may be caused by an open communications link, an open power link, an open ground link, a communications link short to power or to ground, a power to ground short, or a fault in a controller. A fault can be location-specific. A communications fault may be the result of a fault in one of the controllers, a fault in one of the communications links of the CAN bus, a fault in one of the power links of the power grid, or a fault in one of the ground links of the ground grid. Topology graphs can be developed, including a communications topology, a power topology and a ground topology. A reachability analysis is conducted for each of the topology graphs with an open link removed. One embodiment of a reachability analysis of a topology graph is described with reference to FIG. 6.

A short-lived CAN fault is defined as any malfunction of short duration that causes a temporary fault leading to a lost or corrupted message on the CAN bus. The short duration malfunction lasts for a short period of time, e.g., less than a second, and may be self-correcting. An intermittent CAN fault is defined as a short-lived CAN fault that occurs at least twice within a predefined time window, which may be ten seconds in one embodiment. A transient CAN fault is defined as a short-lived fault that occurs only once within the predefined time window.

Detecting and locating an intermittent CAN fault in an embodiment of a controller area network (CAN) includes periodically identifying each of the controllers as either active or inactive by monitoring communications and message transmission in the CAN bus. During ongoing operation, a plurality of short-lived CAN faults may be detected, including a plurality of short-lived CAN faults occurring within the predefined time window, e.g., within a 10 second time window. A controller fault set including one or more inactive controllers is preferably identified for each the short-lived CAN faults within the predefined time window. When more than one short-lived CAN fault occurs within the predefined time window, the short-lived CAN fault is considered intermittent. The controller fault sets including the identified inactive controllers for each of the short-lived CAN faults are subjected to filtering, which can include fault set integration, fault set intersection analysis or another suitable analytical technique that identifies one or a plurality of inactive controllers that are common to all the controller fault sets. The identified one or plurality of inactive controllers common to all the controller fault sets can be employed with the reachability analysis of a communications topology graph to detect, locate and isolate the intermittent fault in the CAN.

Figure 3:
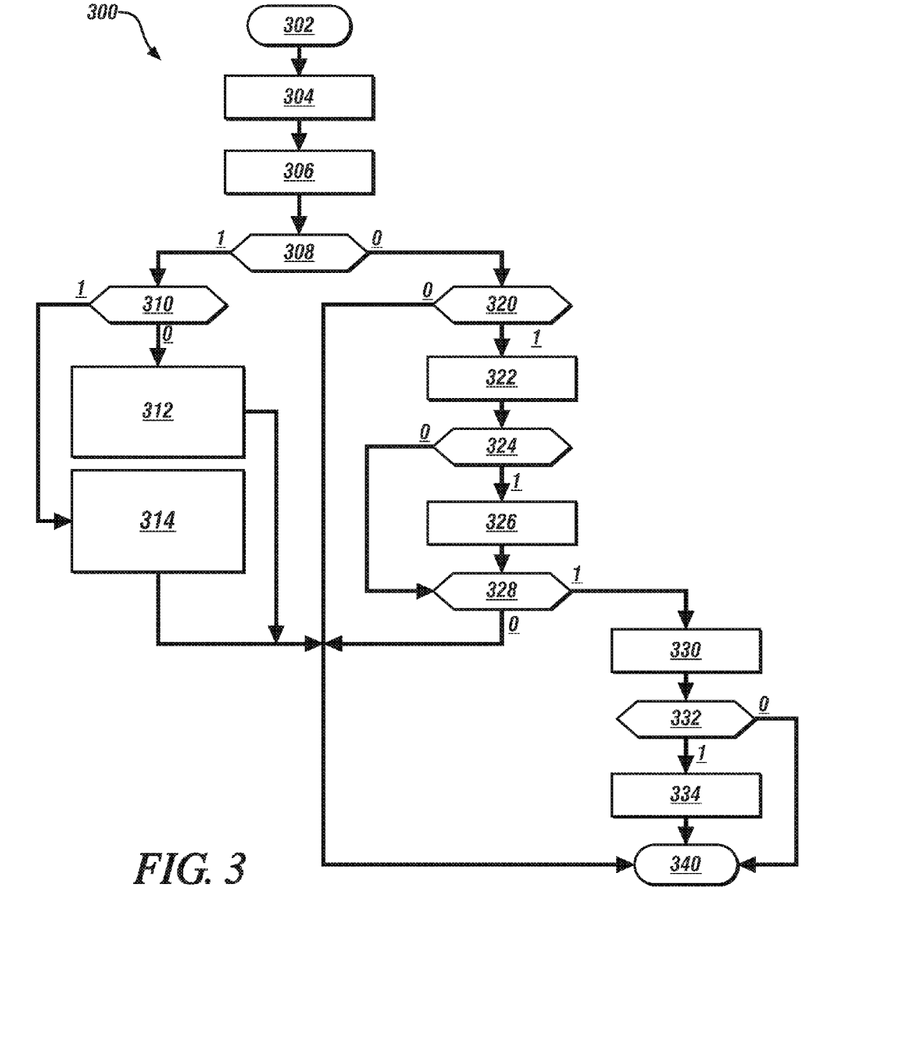
FIG. 3 schematically illustrates an exemplary CAN monitoring routine to detect and isolate an intermittent fault in a CAN, in accordance with the disclosure.

FIG. 3 schematically illustrates an exemplary CAN monitoring routine 300 to detect and isolate an intermittent communication fault in a CAN. Table 1 is provided as a key to routine 300 of FIG. 3, wherein the numerically labeled blocks and the corresponding functions are set forth as follows.

TABLE 1

| BLOCK | BLOCK CONTENTS |
| --- | --- |
| 302 | Start |
| 304 | Set int_timer = int_timer − 1 if non-zero<br>Set busoff_timer = busoff_timer − 1 if non-zero |
| 306 | Call controller active supervision routine |
| 308 | Are any of the controllers inactive, i.e.,<br>Is Inactive[i] = 1 for any controller[i]? |
| 310 | Is fflag = 1? |
| 312 | Set fault flag: fflag = 1<br>Reset busoff_timer<br>Reset active controller to unknown status<br>Store current fault information |
| 314 | Update history fault information<br>Update current fault information |
| 320 | Is fflag = 1? |
| 322 | Set fflag = 0 |
| 324 | Is int_timer = 0? |
| 326 | Reset fault count (fcount =0)<br>Reset integrated fault information |
| 328 | Is busoff_timer = 0?AND<br>Is int_inactive[i][M] =1 for some controller[i]? |
| 330 | Update fault count<br>Reset inter-arrival timer<br>Perform data filtering and update integrated fault information |
| 332 | Is fcount = COUNT_TO_REPORT_FAULT? |
| 334 | Report integrated fault information for diagnosis |
| 340 | End |

Calibratable parameters associated with execution of the CAN monitoring routine 300 include the following:

$T_d$, which is the execution interval of the CAN monitoring routine 300, which is a calibratable value with a default value of 50 ms;

N, which is the total quantity of controllers in the CAN;

BUSOFF_RECOVERY_TIME, which is a calibratable quantity of execution cycles of the CAN monitoring routine 300 that indicates an elapsed time for recovery of communications;

INTER_ARRIVAL_TIME, which is a calibratable threshold quantity of cycles of the CAN monitoring routine 300 that indicates an elapsed time between two short-lived faults. When the elapsed time between the two short-lived faults is less than the INTER_ARRIVAL_TIME, the short-lived faults are considered intermittent faults. When the elapsed time between the two short-lived faults is greater than the INTER_ARRIVAL_TIME, the short-lived faults are considered transient faults, which are not reported. In one embodiment, the INTER_ARRIVAL_TIME is set to 10 seconds; and COUNT_TO_REPORT_FAULT, which is a calibratable minimum threshold quantity of short-lived CAN faults required to report occurrence of an intermittent fault.

Variables associated with execution of the CAN monitoring routine 300 include the following:

fflag, which is a flag indicating a fault is occurring;

int_timer, which is a timer measuring the elapsed time between occurrences of two of the short-lived CAN faults, i.e., the predefined time window;

busoff_timer, which is a bus-off recovery timer;

fcount, which is a quantity of short-lived CAN faults;

int_inactive[i][j], which indicates intermittent fault status for each controller[i] and for M cycles, wherein i=1, . . . , N quantity of controllers and j=1, . . . , M, wherein M=BUSOFF_RECOVERY_TIME cycles+1; and finactive[i] is integrated fault information for each controller after executing data filtering from multiple short-lived CAN faults faults and i=1, . . . , N quantity of controllers.

On power-on, the variables are initialized as follows: fflag=0, int_timer=0; busoff_timer=0; fcount=0, finactive[i]=−1 for i=1, . . . , N, int_inactive[i][j]=−1, for i=1, . . . , N and j=1, . . . , M, wherein −1 indicates an unknown status.

Upon starting execution of the current iteration (302), several operations are executed, including decrementing the timer (int_timer) measuring the elapsed time between occurrences of two faults and decrementing the timer (busoff_timer) measuring the bus-off recovery time (304).

A controller active supervision routine is called to obtain controller active reports for the CAN controllers (306). One embodiment of a controller active supervision routine is described herein with reference to FIG. 4.

The controller active reports are evaluated (308), and when none of the controllers are inactive (Inactive[i]=1?) (308)(0), the fault flag is evaluated to determine if it has been set (fflag=1?) (320). When the fault flag has not been set (320)(0), this iteration ends (340). When the fault flag has been set (320)(1), the fault flag is reset (fflag=0) (322). The timer measuring the elapsed time between two short-lived faults (int_timer) is evaluated (324) to determine whether it has expired, which indicates that there is no occurrence of an intermittent fault. When the timer measuring the elapsed time between two short-lived faults (int_timer) has expired (324)(1), the fault count is reset (fcount=0) and the integrated fault information is reset to indicate that the fault status of all the controllers is unknown (finactive[i]=−1 for i=1, . . . , N) (326). When the timer measuring the elapsed time between two short-lived faults (int_timer) has not expired (324)(0), the actions of step 326 are skipped.

The bus-off recovery timer and the intermittent fault status for each controller[i] for M cycles are evaluated (328). When either the bus-off recovery timer has not expired (busoff_timer≠0) or the intermittent fault status for all of the controllers for Mth cycle fails to indicate a fault in any of the controllers (int_inactive[i][M]=0) (328)(0), this iteration ends (340). When the bus-off recovery timer has expired (busoff_timer=0) and the intermittent fault status indicates a fault for one or more of the controllers for Mth cycle (int_inactive[i][M]=1) (328)(1), operation continues with the following actions, including updating the fault count (fcount=fcount+1), resetting the inter-arrival timer (int_timer=INTER_ARRIVAL_TIME), and performing data filtering and updating any integrated fault information (330).

Performing data filtering and updating the integrated fault information for each controller from multiple intermittent faults includes the following:
for i=1 to N,
   if int_inactive[i][M]=0
     then finactive[i]=0,
   else if int_inactive[i][M]=1 and finactive[i]=−1
     then finactive[i]=1.

The fault count (fcount) is evaluated, and when it is equal to a minimum fault count (fcount=COUNT_TO_REPORT_FAULT) (332)(1), the system reports the integrated fault information for diagnosis using the topology data (Report (finactive[i], i=1, . . . , N) (334), and this iteration ends (340). When the fault count is less than a minimum fault count, i.e., less than COUNT_TO_REPORT_FAULT (332)(0), this iteration ends without further action (340).

When any one or more of the controllers is inactive (Inactive[i]=1) (308)(1), the fault flag is evaluated to determine if it has been set (fflag=1?) (310). When the fault flag has not been set (310)(0), the fault flag is set (fflag=1), the bus-off timer is reset (busoff_timer=BUSOFF_RECOVERY_TIME), any active controllers are reset to unknown status (For i=1 to N, inactive[i]=−1 if inactive[i]=0), and the present cycle fault information is stored (for i=1 to N, if inactive[i]=1 then int_inactive[i][1]=1, otherwise int_inactive[i][1]=−1) (312). This iteration ends without further action (340).

When the fault flag has been set (310)(1), first fault history information is updated (for i=1 to N, j=M to 2, int_inactive[i][j]=int_inactive[i][0]) and the present fault information is stored (if inactive[i]=0 then int_inactive[i][1]=0, else if inactive[i]=1 and int_inactive[i][1]=−1 then int_inactive[i][1]=1) (314). The present fault information and the fault history information are fault sets indicating present inactive controller(s) and historical inactive controller(s), respectively. This iteration ends without further action (340).

Figure 4:
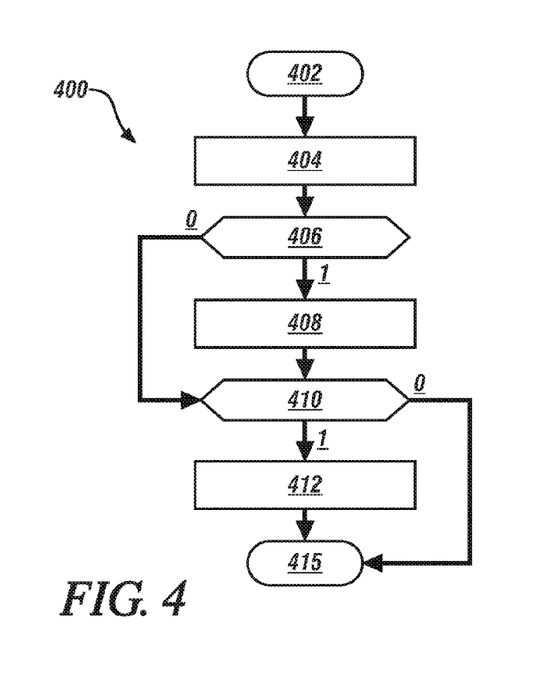
FIG. 4 illustrates a controller active supervision routine to monitor controller status including detecting whether any of the controllers connected to the CAN bus is inactive, in accordance with the disclosure.

FIG. 4 schematically illustrates the controller active supervision routine 400 to monitor controller status including detecting whether any of the controllers connected to the CAN bus is inactive. The controller active supervision routine 400 is executed to obtain controller-active reports based upon monitoring communications originating from the controllers in the CAN. The controller active supervision routine 400 is called periodically by CAN monitoring routine 300. Table 2 is provided as a key to the controller active supervision routine 400 of FIG. 4, wherein the numerically labeled blocks and the corresponding functions are set forth as follows.

TABLE 2

| BLOCK | BLOCK CONTENTS |
| --- | --- |
| 402 | Initialize terms |
| 404 | Set T[i] = T[i] − 1 if T[i] > 0 for any controller[i] |
| 406 | Query controllers - has a new message been received from controller[i]? |
| 408 | Set Inactive[i] = 0 Reset T[i] = Th[i] |
| 410 | Is T[i] = 0 for any controller[i]? |
| 412 | Set inactive [i] = 1 for all controllers[i] |
| 415 | Return inactive [i] = 1 for all controllers[i] |

Parameters include the following:
i designates a specific controller[i], with i=1, . . . , N,
N is the total number of controllers in the CAN; and
Th[i] is the time-out value for active supervision of the controllers[i], which is measured by the number of cycles of the CAN monitoring routine 300 and is calibratable.

The variables include the following:
T[i] is a timer for the active supervision of controller[i]; and
inactive[i] indicates an inactive status of controller[i], wherein i=1, . . . , N.

Upon the first time execution of the controller active supervision routine 400 (402) in each ignition cycle, a time-out value Ti for active supervision of the controllers is initialized in accordance with T[i]=Th[i], inactive[i]=−1, wherein −1 represents unknown status and i=1, . . . , N. Thus, the controllers are neither designated as being in the active state or the inactive state at the beginning of first execution of this routine in each ignition cycle.

The time-out value T[i] is decremented by 1, i.e., T[i]=T[i]−1 if T[i] is greater than zero for any of the controllers (404), and the system monitors to determine whether any new message has been received from any of the controllers (406). If so (406)(1), the inactive flag inactive[i] is reset (=0) for the specific controller[i] from which a message has been received and the time-out value T[i] is re-initialized to Th[i] (408). In continuation, or if no new message has been received from any of the controllers (406)(0), the time-out value T[i] is evaluated to determine if it has achieved a value of zero for any of the controllers (410), and if so (410)(1), the inactive flag Inactive[i] is set (=1) for any specific controller from which a message has not been received (412). If not (410)(0), this iteration ends with the results returned to the CAN monitoring routine 300 indicating which of the specific controllers connected to the CAN bus, if any, is inactive (inactive[i] for all controllers[i]) (415).

Figure 51:
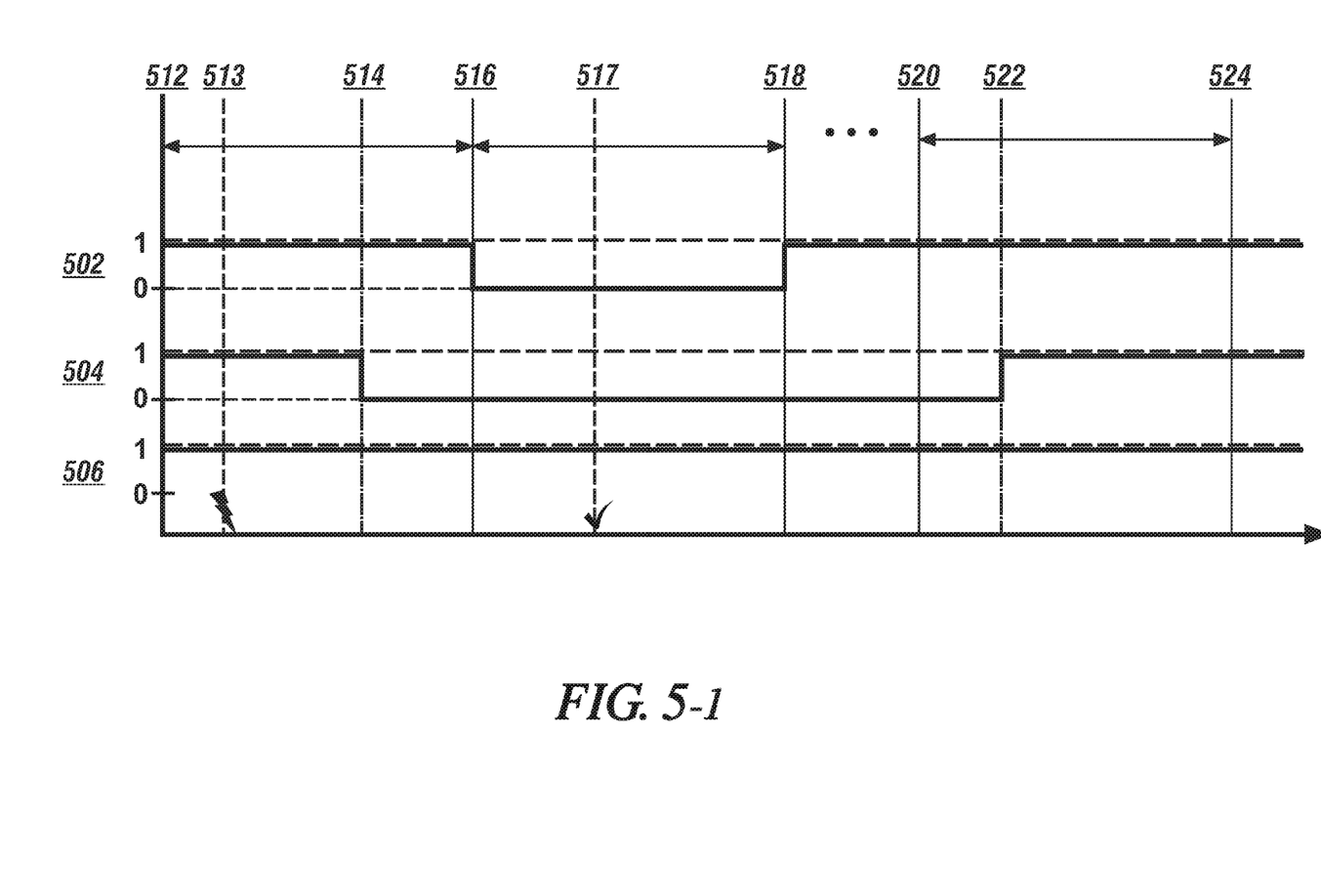
Figure 52:
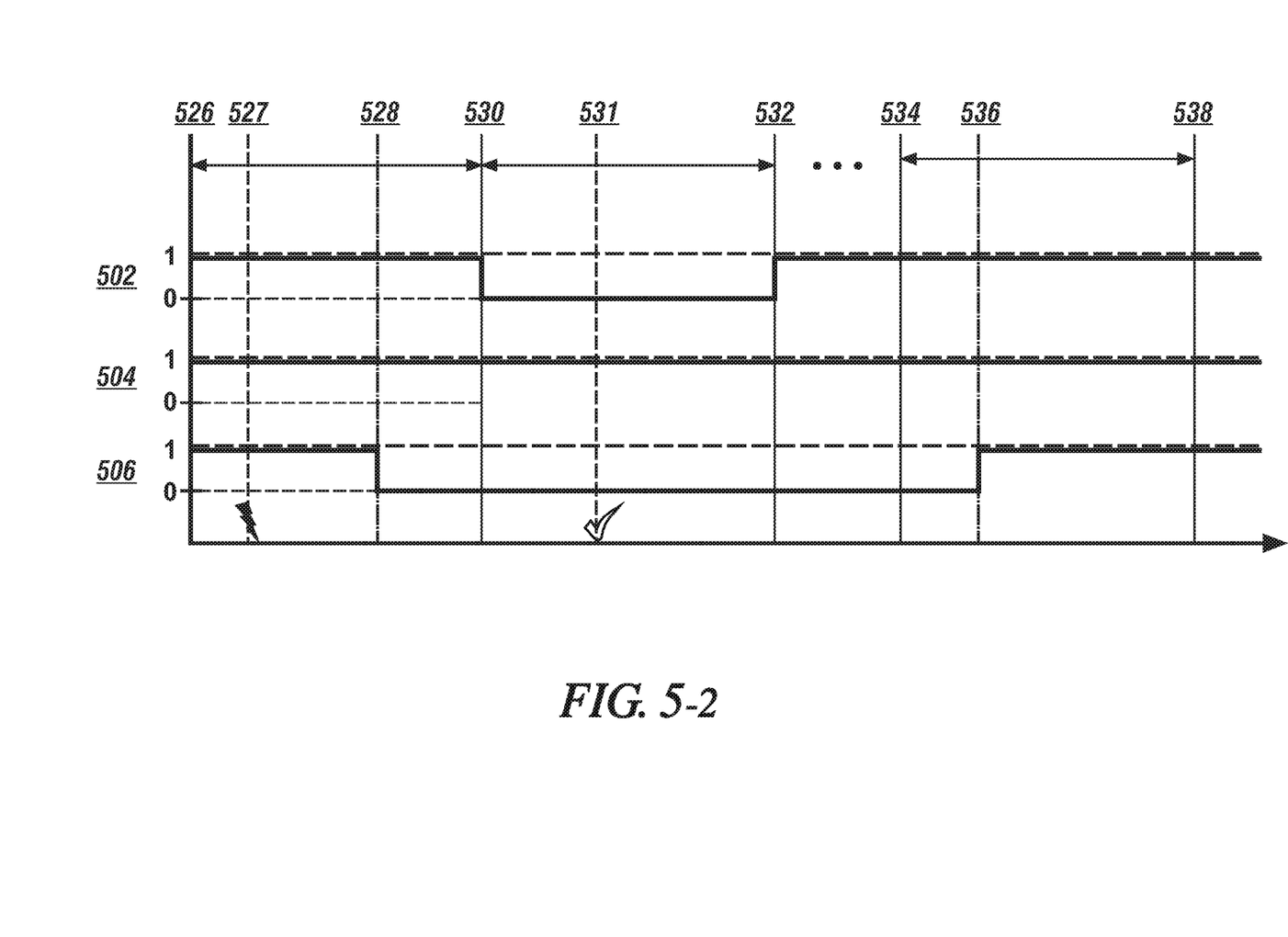

FIG. 5 consisting of FIGS. 5-1 and 5-2 schematically illustrates a timeline 500 that indicates controller status, i.e., one of active or inactive, for a plurality of CAN elements including controllers 502, 504 and 506 in relation to time. The timeline 500 depicts operation of the CAN monitoring routine 300, including controller status of active (1) and inactive (0) for each of the controllers 502, 504 and 506. Operation of a monitoring controller is not shown. The controllers 502, 504 and 506 are active (1) at the start of a first fault detection window, as shown at time 512. At time 513 a first fault occurs. The location of the first fault is unknown to a monitoring controller, but is shown as an open wire in the positive wire (CAN+) between controllers 502 and 504 for purposes of illustration. At time 514, controller 504 is assigned the bus-off error state and enters a bus-off recovery mode due to the disturbance caused by the first fault and switches to inactive (0) status. The first fault detection window ends at time 516, and both controllers 502 and 504 are inactive (0) due to the disturbance caused by the fault. Controller 506 remains active (1). During a second fault detection window, the open wire in the positive wire (CAN+) between controllers 502 and 504 reconnects at time 517, thus ending the occurrence of the first fault. The second fault detection window ends at time 518, at which time controller 502 becomes active (1). Controller 504 remains inactive (0) due to the operation of the bus-off recovery mode. Controller 506 remains unchanged and active (1).

Subsequent fault detection windows occur between times 518 and 520 with no change in status for controllers 502, 504 and 506. At time 522 the bus-off recovery time expires and controller 504 becomes active (1), thus indicating presence of a first short-lived fault. A polling delay occurs between times 522 and 524, which is when the present fault detection window ends. The monitoring controller identifies the inactive controllers associated with the first short-lived fault by identifying the controllers that are inactive at the end of a fault detection window occurring at the start of the bus-off recovery time, taking into account the polling delay. Thus, the inactive controllers associated with the first short-lived fault are the controllers that are inactive at time 516 as shown. At time 524 controllers 502, 504 and 506 are all active and remain active through time 526.

At time 527 a second fault occurs. A difference between time 527 and time 513 provides an elapsed time between two short-lived faults (int_timer), which is evaluated and indicates occurrence of an intermittent fault. The location of the fault is unknown to a monitoring controller, but is again an open wire in the positive wire (CAN+) between controllers 502 and 504 for purposes of illustration. At time 528, controller 506 is assigned the bus-off error state, switches to inactive (0) status and enters the bus-off recovery mode due to the disturbance caused by the fault. This fault detection window ends at time 530, and both controllers 502 and 506 are inactive (0) due to the disturbance caused by the fault. Controller 504 remains active (1). During a subsequent fault detection window, the open wire in the positive wire (CAN+) between controllers 502 and 504 reconnects at time 531, thus ending the occurrence of the fault. The subsequent fault detection window ends at time 532, at which time controller 502 becomes active (1). Controller 506 remains inactive (0) due to the operation of the bus-off recovery mode. Controller 504 remains unchanged and active (1).

Subsequent fault detection windows occur between times 532 and 534 with no change in status for controllers 502, 504 and 506. At time 536 the bus-off recovery time expires allowing controller 506 to exit the bus-off error state and become active (1) thus indicating presence of a second short-lived fault. A polling delay occurs between times 536 and 538, which is when the present fault detection window ends. The monitoring controller identifies the inactive controllers associated with the second short-lived fault by identifying the controllers that are inactive at the end of a fault detection window occurring at the start of the bus-off recovery time, taking into account the polling delay. Thus, the inactive controllers associated with the second short-lived fault are the controllers that are inactive at time 530 as shown. At time 538 controllers 502, 504 and 506 are all active and remain active. The CAN monitoring routine 300 obtains accurate fault information by taking into account the bus-off recovery time and the polling delay to identify the first fault set including controllers 502 and 504 associated with the first intermittent fault at time 516 and to identify a second fault set including controllers 502 and 506 associated with the second intermittent fault at time 530. Subsequent filtering and integration of the first and second fault sets identifies controller 502 as the inactive controller common to both the first and second fault sets, which can be used for diagnosis using topology data and a reachability analysis to identify location of the intermittent fault.

Figure 6:
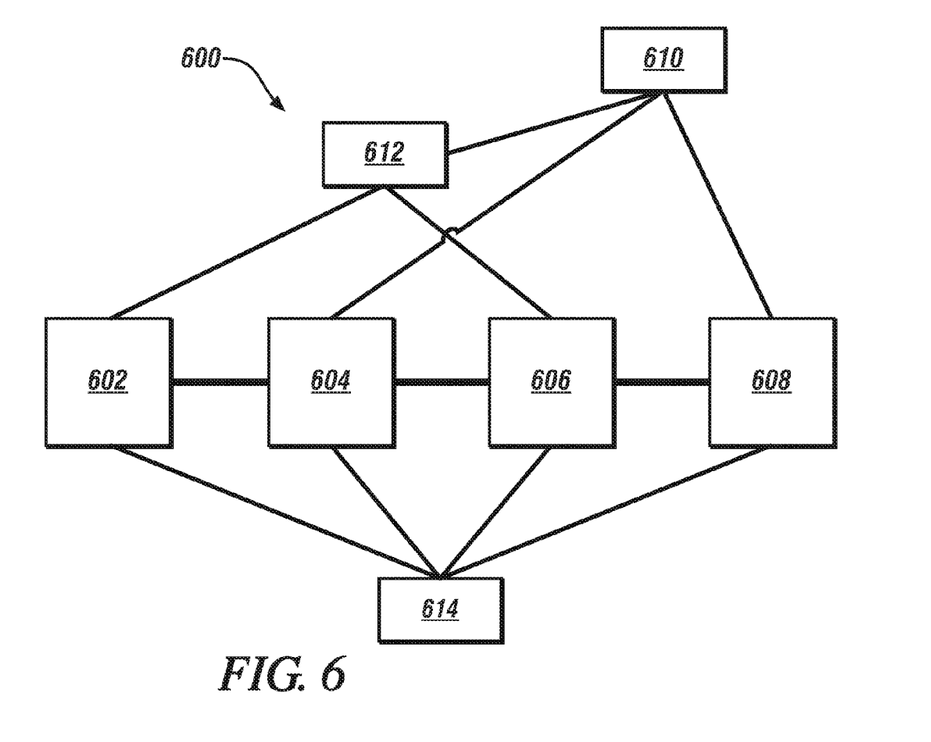
FIG. 6 illustrates an exemplary CAN including controllers, monitoring controller, power supply, battery star and ground, each connected via a link, in accordance with the disclosure.

FIG. 6 illustrates a network topology for an exemplary CAN 600 including controllers 602, 604 and 606, monitoring controller 608, power supply 610, battery star 612 and ground 614, each connected via a communications link as shown. The monitoring controller 608 observes symptoms that indicate various fault sets, with each fault set having a corresponding fault signature that includes a set of inactive controllers. The monitoring controller 608 can include any of or all of the controllers on the communications bus, i.e., all of the controllers can be configured to execute fault diagnosis, since any message on the CAN bus can be observed at any of and all of the controller nodes.

A fault model is generated for the network topology and includes a plurality of symptoms observed by a monitoring controller for each of a plurality of network or CAN faults and a corresponding fault signature vector $V_f^{inactive}$ that includes a set of observed inactive controllers associated therewith. An exemplary fault model associated with the network topology of FIG. 6 includes the following with reference to Table 3, wherein the network topology for the CAN 600 includes controllers 602 [1], 604 [2] and 606 [3], monitoring controller 608 [0], power supply 610 [4], battery star 612 [5] and ground 614 [6]. The fault model is derived employing a reachability analysis of the network topology wherein the symptom is induced and communications are monitored to determine which of the controllers is inactive for that symptom.

TABLE 3

| Fault Set | Symptom | Contents of Fault signature vector $V_f^{inactive}$ |
|---|---|---|
| f1 | Open Link [1]-[2]<br>Open Link [1]-[5]<br>Open Link [1]-[6]<br>[1] Fault | [1] |
| f2 | Open Link [2]-[4]<br>Open Link [2]-[6]<br>[2] Fault | [2] |
| f3 | Open Link [3]-[5]<br>Open Link [3]-[6]<br>[3] Fault | [3] |
| f4 | Open Link [2]-[3] | [1], [2] |
| f5 | Open Link [4]-[5] | [1], [3] |
| f6 | Open Link [1]-[2]<br>CAN bus wire short | [1], [2], [3] |

A first fault set f1 can include a symptom of an open link between one of controller 602 and battery star 612, controller 602 and ground 614, controller 602 and controller 604, and a fault with controller 602, with a corresponding fault signature vector $V_f^{inactive}$ including controller 602 as inactive. A second fault set f2 can include a symptom of an open link between one of controller 604 and battery 610, controller 604 and ground 614, and a fault with controller 604, with a corresponding fault signature vector $V_f^{inactive}$ including controller 604 as inactive. A third fault set f3 can include a symptom of an open link between one of controller 606 and battery star 612, controller 606 and ground 614, and a fault with controller 606 with a corresponding fault signature vector $V_f^{inactive}$ including controller 606 as inactive. A fourth fault set f4 can include a symptom of an open link between controller 604 and controller 606 with a corresponding fault signature vector $V_f^{inactive}$ including controllers 602 and 604 as inactive. A fifth fault set f5 can include a symptom of an open link between battery 610 and battery star 612 with a corresponding fault signature vector $V_f^{inactive}$ including controllers 602 and 606 as inactive. A sixth fault set f6 can include a symptom of an open link between monitoring controller 608 and controller 606 with a corresponding fault signature vector $V_f^{inactive}$ including controllers 602, 604 and 606 as inactive. Other fault signature vector $V_f^{inactive}$ may be developed in accordance with a specific architecture of a CAN system employing a reachability analysis of a topology graph of the CAN.

A CAN monitoring routine can isolate a fault by generating a system model that includes one or a plurality of controllers and/or a monitoring controller. Each of the controllers transmits a set of messages that may have different periods or repetition rates. Topology graphs, e.g., as shown with reference to FIG. 6 include topologies $G_{bus}$, $G_{bat}$, and $G_{grid}$ related to the communications bus, the power bus and the ground bus, respectively. A fault set F can include each controller node fault, each bus link open fault, each power link open fault, each ground link open fault and other faults for the topology graphs. A pre-operation exercise generates a fault signature vector $V_f^{inactive}$ composed of a set of inactive controllers associated with each fault f for each fault f in the fault set F. The fault signature vector $V_f^{inactive}$ is employed to isolate a fault to one of the controllers, bus links, power links, ground links, etc.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for monitoring a controller area network (CAN) comprising a plurality of CAN elements including a communication bus and a plurality of controllers, the method comprising:
    detecting occurrences of a first short-lived CAN fault and a second short-lived CAN fault within a predefined time window;
    identifying a first fault set including at least one inactive controller associated with the first short-lived CAN fault and identifying a second fault set including at least one inactive controller associated with the second short-lived CAN fault; and
    locating an intermittent fault in the CAN based upon the first and second fault sets comprising:
        determining a fault model comprising a plurality of faults and corresponding observed inactive controllers for the CAN;
        determining an inactive one of the controllers common to the first and second fault sets; and
        locating the intermittent fault in the CAN based upon the inactive one of the controllers and the fault model.

2. The method of claim 1, wherein detecting occurrences of the first short-lived CAN fault and the second short-lived CAN fault within the predefined time window comprises:
    detecting the first short-lived CAN fault; and
    detecting the second short-lived CAN fault occurring after detection of the first short-lived CAN fault.

3. The method of claim 2, wherein each of the first and second short-lived CAN faults comprises a malfunction of short duration that causes a lost or corrupted message on the communications bus.

4. The method of claim 1, wherein detecting occurrences of the first short-lived fault and the second short-lived fault within the predefined time window comprises periodically identifying each of the controllers as either active or inactive.

5. The method of claim 1, wherein detecting occurrence of the first short-lived fault comprises periodically monitoring the controllers, identifying one of the controllers as inactive and subsequently identifying said one of the controllers as active.

6. The method of claim 5, wherein identifying one of the controllers as inactive and subsequently identifying said one of the controllers as active comprises identifying said one of the controllers as active less than one second after identifying said one of the controllers as inactive.

7. The method of claim 1, wherein determining the fault model comprising the plurality of faults and corresponding observed inactive controllers for the CAN comprises executing a reachability analysis of a communications topology of the CAN.

8. The method of claim 1, wherein locating the intermittent fault in the CAN based upon the inactive one of the controllers and the fault model comprises locating one of a controller node fault, a CAN bus link open fault, a power link open fault, a ground link open fault, and a power-ground short fault.

9. A method for detecting an intermittent fault in a controller area network (CAN) comprising a plurality of CAN elements including a communication bus and a plurality of controllers, the method comprising:
    detecting occurrence of a first short-lived CAN fault and identifying a first fault set including at least one inactive controller associated with the first short-lived CAN fault;
    detecting occurrence of a second short-lived CAN fault and identifying a second fault set including at least one inactive controller associated with the second short-lived CAN fault within a predefined time window subsequent to the first short-lived CAN fault;
    determining an inactive one of the controllers common to the first and second fault sets; and
    locating an intermittent fault in the CAN based upon the inactive one of the controllers comprising:
        determining a fault model comprising a plurality of faults and corresponding observed inactive controllers for the CAN; and
        locating the intermittent fault in the CAN based upon the inactive one of the controllers and the fault model.

10. The method of claim 9, wherein detecting the occurrences of the first short-lived CAN fault and the second short-lived CAN fault comprises periodically identifying each of the controllers as either active or inactive.

11. The method of claim 9, wherein detecting the occurrence of the first short-lived CAN fault comprises periodically monitoring the controllers, identifying one of the controllers as inactive and subsequently identifying said one of the controllers as active.

12. The method of claim 9, wherein determining the fault model comprising the plurality of faults and corresponding observed inactive controllers for the CAN comprises executing a reachability analysis of a communications topology of the CAN.

13. A method for locating an intermittent fault in a controller area network (CAN), comprising:
    monitoring message transmission in a CAN bus;
    detecting occurrence of a first short-lived fault leading to a lost or a corrupted message on the CAN bus;
    identifying at least one inactive controller associated with the first short-lived fault;
    detecting occurrence of a second short-lived fault leading to a lost or a corrupted message on the CAN bus within a predefined time window subsequent to the first short-lived fault;
    identifying at least one inactive controller associated with the second short-lived fault;

determining at least one of said at least one identified inactive controllers is common to both the first short-lived fault and the second short-lived fault; and locating an intermittent fault in the CAN based upon said at least one of said identified inactive controllers that is common to both the first short-lived fault and the second short-lived fault, comprising:

determining a fault model comprising a plurality of faults and corresponding observed inactive controllers for the CAN; and locating the intermittent fault in the CAN based upon the inactive one of the controllers and the fault model.

14. The method of claim 13, wherein detecting occurrence of the first short-lived fault and occurrence of the second short-lived fault comprises periodically identifying each of the controllers as either active or inactive.

15. The method of claim 13, wherein detecting occurrence of the first short-lived fault comprises periodically monitoring the controllers, identifying one of the controllers as inactive and subsequently identifying the one of the controllers as active.

16. The method of claim 13, wherein determining the fault model comprising the plurality of faults and corresponding observed inactive controllers for the CAN comprises executing a reachability analysis of a communications topology of the CAN.

* * * * *